A. W. FARRAND.
SPARK-ARRESTER.

No. 184,706. Patented Nov. 28, 1876.

Witnesses

Inventor.

UNITED STATES PATENT OFFICE.

ANSON W. FARRAND, OF OSHKOSH, WISCONSIN, ASSIGNOR OF TWO-THIRDS OF HIS RIGHT TO JAMES LEWIS AND ALEXANDER GALLINGAR, OF SAME PLACE.

IMPROVEMENT IN SPARK-ARRESTERS.

Specification forming part of Letters Patent No. 184,706, dated November 28, 1876; application filed August 28, 1876.

*To all whom it may concern:*

Be it known that I, ANSON W. FARRAND, of the city of Oshkosh, in the county of Winnebago and State of Wisconsin, have invented certain Improvements in Spark-Arresters, of which the following is a specification:

My invention relates to the use of an inverted cone in the stack of the boiler, in combination with a deflector, and a basin or tank set on the top (base) of the cone, containing water to extinguish the sparks, said tank having on its bottom an upward-projecting lip spiral in plan, and an overflow-pipe in the center, so that the water which is pumped into the tank at the side has a current through the spiral to the central discharge, carrying with it the extinguished sparks.

It further relates to the use, in combination with said tank, deflector, and cone, of a tangling plate or plates as a cover to the tank, so constructed as to prevent the water in the tank from spattering over or being driven out by the draft, and also to prevent the passage of a spark that might escape the water, and still allow a free escape to the smoke.

Figure 1:
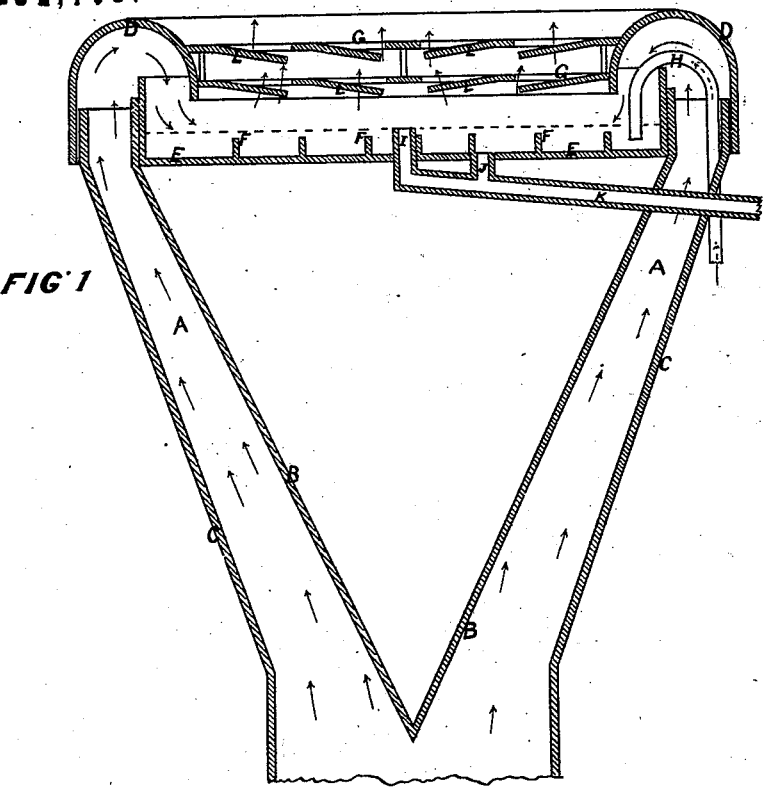
Figure 2:
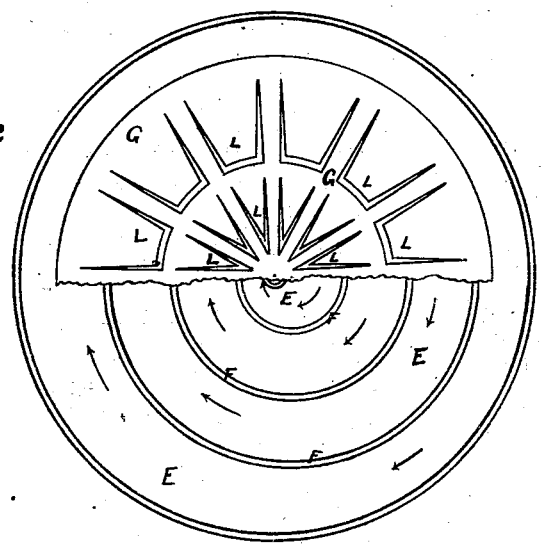

Figure 1 is a section of my invention. Fig. 2 is a plan of the tank, showing part of the tangling-plate removed.

C is the smoke-stack. The smoke and other products of combustion are turned by the inverted cone B, which is fixed inside of the smoke-stack, and are confined within the flue A, over the top of which is the deflector D, which is turned down low enough inside to make sure of passing all the sparks into the water. However, should a spark escape the water, it would be arrested by the lips L of cover G, and fall back into the water. F is a spiral lip on the bottom of the tank to steady the water, and also to conduct the current to the overflow-pipe at the center. The cover or tangler G is cut into lips L, as shown in Fig. 2, and the lips bent down to afford an opening for the passage of the smoke. To render this tangler more absolutely secure, more than one plate may be used in its construction. I is the overflow-pipe, and J is the discharge-pipe for emptying the tank. Both of these discharge into the waste-pipe K. H is a pipe for conducting the water from the pump to the tank.

Having thus described my invention, what I claim as new, and desire to secure by Letters Patent, is—

1. The water-tank E, having a spiral lip, F, and central overflow-pipe I, in combination with the inverted cone B and deflector D, for the purpose of collecting and extinguishing the sparks, substantially as shown and described.

2. The spark-arrester consisting of the inverted cone B, fixed inside of the smoke-stack C of a steam-boiler, the deflector D, tank E, and tangling plate or plates G, all constructed and combined substantially as shown and described.

ANSON W. FARRAND.

Witnesses:
C. PALMER,
W. GUDDEN,
C. D. CHURCH.